United States Patent [19]
Harrison

[11] Patent Number: 5,822,693
[45] Date of Patent: Oct. 13, 1998

[54] METHOD AND APPARATUS FOR CONTROLLING A BASE STATION UTILIZING A DUAL MODE MOBILE STATION

[75] Inventor: Peter D. Harrison, Ascot, United Kingdom

[73] Assignee: Nokia Mobile Phones Limited, Espoo, Finland

[21] Appl. No.: 634,780

[22] Filed: Apr. 19, 1996

[51] Int. Cl.⁶ .............................. H04Q 7/20; H04Q 7/36
[52] U.S. Cl. .................... 455/432; 455/435; 455/436; 455/437; 455/552
[58] Field of Search ........................... 455/432, 435, 455/436, 437, 426, 552, 127, 38.3, 560, 572, 574, 420

[56] References Cited

U.S. PATENT DOCUMENTS

| | | | |
|---|---|---|---|
| 4,613,990 | 9/1986 | Halpern | 455/38.3 |
| 5,257,257 | 10/1993 | Chen et al. | 370/18 |
| 5,319,795 | 6/1994 | Hamabe et al. | 455/436 |
| 5,396,653 | 3/1995 | Kivari et al. | 455/88 |
| 5,428,668 | 6/1995 | Dent et al. | 455/574 |
| 5,436,906 | 7/1995 | Kasuya et al. | 455/432 |
| 5,598,459 | 1/1997 | Haartsen | 455/436 |
| 5,675,629 | 10/1997 | Raffel et al. | 455/435 |

*Primary Examiner*—Wellington Chin
*Assistant Examiner*—Keith Ferguson
*Attorney, Agent, or Firm*—Brian T. Rivers

[57] ABSTRACT

A method and apparatus for controlling a base station of a first telecommunications system using control information generated in a second telecommunications system and transferred to the base station through a mobile station capable of operating in both the first and second systems. The control information is transmitted from the second system to the mobile station during operation of the mobile station in the second system. Upon operation of the mobile station in the first system the control information is then transferred to the first system. The control information is then used within the first system to control operation of a base station of the first system. The control information may include instructions defining parameters of operation for the base station. The instructions may include control data assigning radio channels or a frequency band to the base station and, instructions for setting output power levels for the base station.

30 Claims, 1 Drawing Sheet

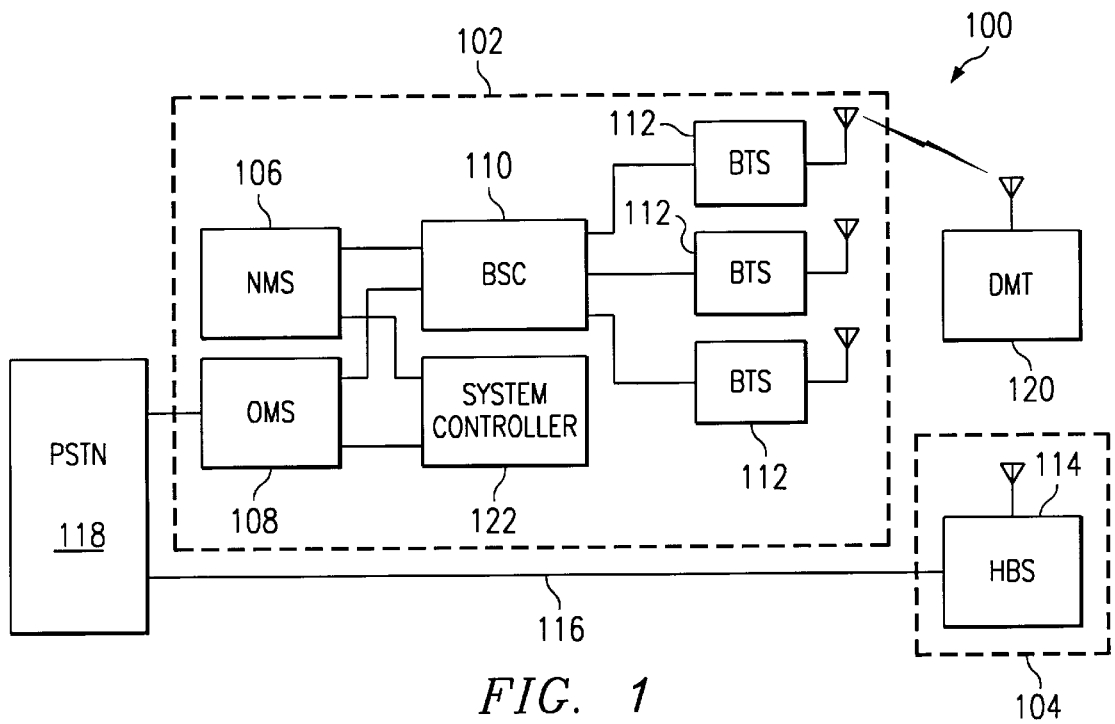
FIG. 1
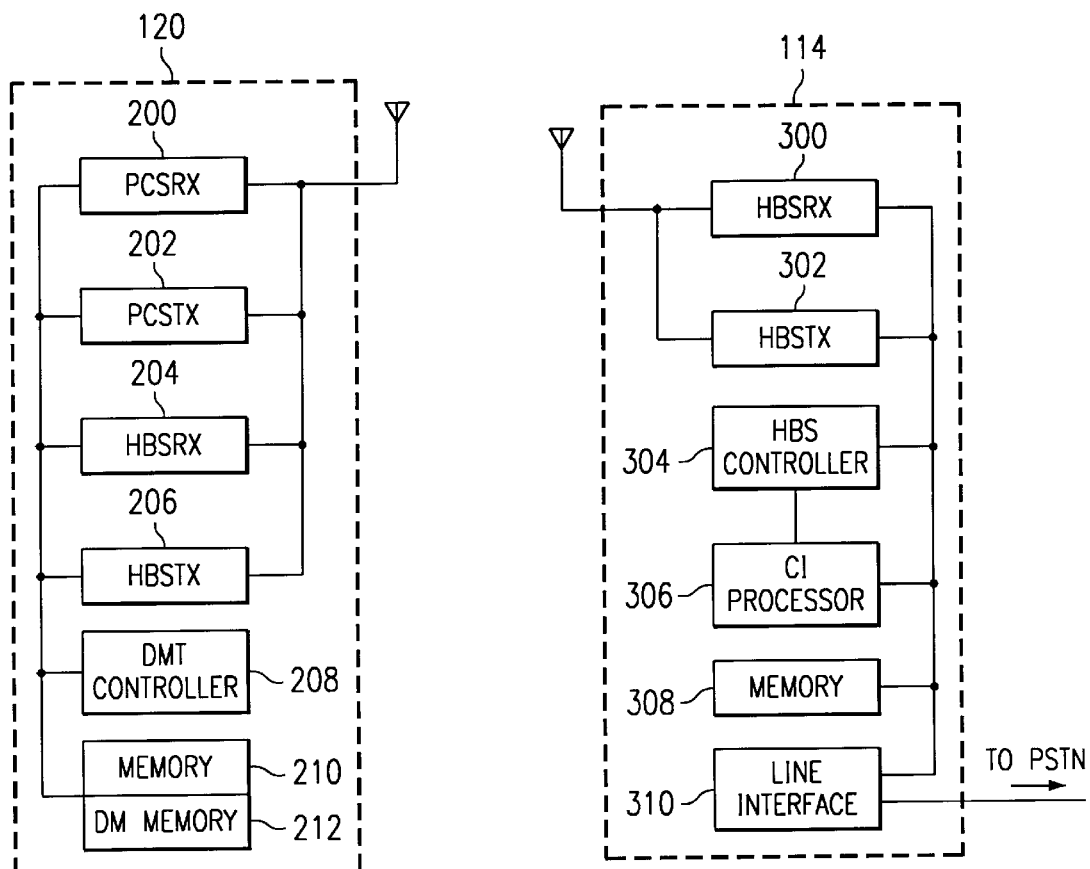
FIG. 2
FIG. 3

METHOD AND APPARATUS FOR CONTROLLING A BASE STATION UTILIZING A DUAL MODE MOBILE STATION

FIELD OF THE INVENTION

This invention relates to the control of base stations within telecommunications systems and, more particularly, to an apparatus and method for controlling a base station of a first telecommunications system using control information generated in a second telecommunications system.

BACKGROUND OF THE INVENTION

The rapid increase in the different types and numbers of telecommunications systems presently operating, or proposed for operation, requires that these telecommunications systems operate in an increasingly crowded frequency spectrum. Commonly, operation in the available frequency spectrum in a particular geographic area is accomplished by assigning set frequency bands for use by a particular type of system in that particular area. The right to use these set frequency bands may then be licensed to system operators who provide the service or services for which the set frequency bands are allocated. Since available frequency spectrum is scarce, there may be situations in which a system operator may desire to operate more than one type of system within its licensed frequency bands.

If a system operator desires to operate more than one type of system in the same frequency band, it is necessary that the operator has the capability to operate each of the systems in a manner that is noninterfering with the other systems. Depending on what types of services the system operator desires to provide, it may also be desirable that the systems operator be able to operate each of the systems in a cooperative manner with each of the other systems, i.e., having a common control point or common control capability for all of the systems.

One example of a situation of the above type could come about if an operator licensed to use a particular block of frequencies block desired to provide subscriber service through dual mode mobile stations, with the mobile stations capable of operating in one mode for operation, by example, in a personal communications systems (PCS) and in another mode for operation with a cordless phone home base station (HBS), or a system of HBSs. This type of system may be configured with the PCS system as a macro network that includes an imbedded cordless phone system.

The use of cordless phones in the home and office is now widespread. Cordless phones typically use unlicensed frequency spectrum on a noninterfering basis with other users. For example, in the North American PCS frequency allocation scheme, the frequencies in the 1850–1910 MHz and 1930–1990 MHz bands have been licensed for PCS mobile station transmit and receive, respectively, while the 1910–1930 MHz frequency band, known as the unlicensed personal communications spectrum (UPCS), may be used for any other equipment, including cordless telephones.

Since the UPCS band is currently occupied and may not be immediately available, a licensed PCS operator desiring to offer dual mode PCS/cordless phone service as quickly as possible may be forced to operate its cordless system HBSs within its licensed frequency ranges. By virtue of the fact that the spectrum is licensed and finite, the operator has a strong desire to manage the frequencies and power levels used by the HBSs, especially since the HBSs may be used in a home or business environment where the operator has little or no control over the location of the HBS. Additionally, regulations may force the operator to control all devices operating in the licensed spectrum. It would also be an advantage if the operator had the capability to remotely manage the frequencies and power levels from a central location. Control of a HBS may be achieved by placing a modem within the HBS, and using the modem to communicate with a control center. A modem of this type typically uses conventional modem signaling techniques, such as DTMF tones or the Bell 202 standard. However, in general the use of a modem communications device within a HBS is undesirable, as it has a hardware cost and furthermore ties up traffic lines with operator non-call associated traffic.

SUMMARY OF INVENTION

The present invention provides a method and apparatus for controlling a base station of a first telecommunications system from a second telecommunications system. In the method and apparatus in accordance with this invention, control information is transmitted from the second system to a dual mode mobile station during operation of the mobile station in the second system. The control information is stored in the mobile station and is then transmitted from the mobile station to the first system when the mobile station is operated in the first system. The control information is used within the first system to control the operation of a base station of the first system.

Use of the invention allows a system operator to operate the first and second telecommunications systems in a manner that is noninterfering with one another without the need to transmit control information between the systems over land lines or through a modem. This removes the need to use network resources for control signal traffic.

In an embodiment of the invention, a cordless telephone system comprising a home base station (HBS) is contained within a personal communications system (PCS) that operates in the North American PCS frequency bands. The HBS of the cordless telephone network may also operate in the PCS bands. A network operator provides dual mode service in the PCS system and cordless system by providing to a subscriber a dual mode telephone (DMT), capable of operating in either system.

A system controller is connected to a network management system (NMS) of the PCS system. When it is necessary to control operation of the HBS of the cordless system, the system controller generates control information and initiates the transmission of a first control message, including the control information, to a DMT associated with the subscriber belonging to the cordless system in which the HBS is located. The transmission of the control message to the DMT may be, for example, through a short message service (SMS) provided by the PCS system.

Upon receiving the first control message, a controller within the DMT recognizes the message as a HBS control message, and the control information is stored in a memory within the DMT. The control information remains in the memory until the DMT controller initiates transmission of a second message including the control information from the DMT to the HBS. The transmission of the second message may occur upon registration of the DMT in the cordless system. As an alternative, the second message may also be transmitted after a predetermined time or, in a data burst transmission to the cordless system.

The HBS comprises a HBS controller that recognizes the second message as containing control information and signals a control information (CI) processor. The (CI) processor receives the control information and generates commands to the appropriate functions of the HBS so that the HBS operates according to the control information.

The control information may include instructions defining parameters of operation for the HBS. This includes control data for assigning radio channels or a frequency band to the HBS, and/or for setting output power levels for the HBS. The control data may also include instructions setting constraints on the time of operation of the HBS and/or for informing the HBS of changes in the service provided to the DMT.

Information or data may also be transferred from the HBS to the PCS system through the DMT. This allows a network operator to collect data on the performance or usage of the HBS without using a modem and without the need to transmit the data over land lines.

BRIEF DESCRIPTION OF THE DRAWINGS

A more complete understanding of the method and apparatus of the present invention may be had by reference to the following Detailed Description when read in conjunction with the accompanying drawings wherein:

FIG. 1 illustrates a telecommunications network according to an embodiment of the invention;

FIG. 2 is a functional block level diagram showing portions of a dual mode mobile telephone according to an embodiment of the invention; and FIG. 3 is a functional block level diagram showing portions of a home base station according to an embodiment of the invention.

DETAILED DESCRIPTION OF THE INVENTION

FIG. 1 illustrates a telecommunication network 100 according to an embodiment of the invention. Network 100 comprises personal communications system (PCS) system 102, cordless telephone system 104 and dual mode mobile telephone (DMT) 120. In the embodiment shown in FIG. 1, PCS system 102 may operate according to the Personal Communications Services Air Interface Specification, J-STD-007 (PCS 1900) in the downlink frequency band of 1930–1990 Mhz and in the uplink frequency band of 1850–1910 Mhz. Cordless telephone system 104 may operate according to the TIA/EIA 662 standard developed by the telecommunication industry association's subcommittee TR41.6 for personal wireless telecommunications(PWT) in the unlicensed frequency band of 1910–1930 Mhz as specified for PWT, and may also be capable of operating at other frequencies in the 1850–1990 Mhz range. PCS system 102 and cordless telephone system 104 are connected to the public switched telephone network (PSTN) 118. The DMT 120 can be operated in either a PCS mode, for use in PCS system 102, or in a PWT mode for use in cordless telephone system 104. PCS system 102 comprises network management system (NMS) 106, operations maintenance system (OMS) 108, base station controller (BSC) 110, base transceiver stations (BTSS) 112 and system controller 122. The interconnections between the components of PCS system 102 are as well known in the art. Each of BTSs 112 has a separate geographic coverage area within which it provides the air interface between PCS system 102 and DMT 120. PCS system 102 is shown to include three BTSs 112 and one cordless telephone system 104, but may include more or less BTSs or, more cordless systems than are shown. Cordless telephone system 104 comprises a home base station (HBS) 114 that is connected to PSTN 118 through a RJ11 connection 116. Although telecommunications network 100 is shown to include only one cordless telephone system 102 may also include more than one HBS.

DMT 120 can be operated in either PCS mode, to communicate with the PCS system 102, or in PWT mode to communicate with cordless telephone system 104. A user of DMT 120 may select the PCS mode to receive phone service while away from his residential area, and in the service area of PCS system 102. If the user is near his residence and within the coverage area of HBS 114, he may select the PWT mode to receive phone service. As an alternative, the selection between PCS mode and PWT mode could be done automatically by the DMT, depending on the relative strengths of the signals received from the two systems, or based on other criteria. The coverage areas of PCS system 102 and cordless system 104 may overlap or, may be closely located to one another so that interference between the two systems could be caused by operating on the same frequencies.

In the embodiment of FIG. 1, control of HBS 114 is achieved from PCS system 102 by generating control information in system controller 122 and transmitting the control information from PCS system 102 through the PCS air interface to DMT 120, and then transmitting the control information from DMT 120 through the PWT air interface to HBS 114. This allows the operator of telecommunications network 100 to control HBS 114 without using a modem and without the need to transmit control signals through PSTN 118 to the HBS 114.

As an example of the use of the embodiment of FIG. 1, it may be that the network operator of network 100 desires to offer a dual mode service at a time when the unlicensed 1910–1930 Mhz frequency band is unavailable for cordless system use. This may be because existing microwave point to point links have not yet been removed from the band. In this case, the network operator may need to operate cordless system 104 within the licensed PCS bands when the system is first operated, and then later switch HBS 114 to operation in the unlicensed band, when the microwave point to point links are phased out and the additional spectrum becomes available.

When HBS 114 operates in the licensed PCS frequency band, control information is generated in system controller 122 of PCS system 102. The control information may contain transmission power levels and radio channel assignments for HBS 114. The transmission power levels and radio channel assignment can be determined, as desired by the network operator, from a predetermined algorithm operating on data gathered from within the system. The collected data could be processed algorithmically in system controller 122 to determine transmission power levels and radio channel assignment for HBS 114, from the licensed PCS band. For example, if the interference on a radio channel assigned to HBS 114, as measured at any BTS of BTSs 112, was above a certain predetermined level, control information indicating a new channel or power level assignment for HBS 114 could be generated in system controller 122.

After generating control information, system controller 122 would then initiate, through NMS 106 and BSC 110, the transmission of a first HBS control message including the new control information, through the PCS system SMS from a BTS of BTSs 112 and to the DMT 120. The SMS message contains a field identifying the message as a HBS control message. The remaining character fields in the message contain the control information. If necessary, an HBS control message could comprise two or more SMS messages.

The first HBS control message may be transmitted to DMT 120 during the first operation of DMT 120 in PCS system 102 after initiation of the HBS control message by system controller 122. The first HBS control message may also be set to be transmitted only after a predetermined time interval expires from the time of initiation of the HBS control message by system controller 122. In any event, the transmitted first HBS control message is received at DMT 120.

Referring now to FIG. 2, therein is shown a functional block diagram showing portions of DMT 120 according to the embodiment of FIG. 1. DMT 120 comprises PCS receiver (PCSRX) 200, PCS transmitter (PCSTX) 202, HBS receiver (HSBRX) 204, HBS transmitter (HBSTX) 206, DMT controller 208, memory 210 and dual mode (DM) memory 212. DMT 120 receives the message at PCSRX 200. DMT controller 208 recognizes the message as a first HBS control message and stores the control information included in the HBS message in DM memory 212. The control information remains stored in DM memory, until the DMT transmits the control information to cordless system 104.

When the dual mode subscriber switches to PWT mode and registers with HBS 114 of cordless system 104, DMT controller 208 initiates transmission of a second HBS control message, including the control information stored in DM memory 212, to HBS 114 through HBSTX 206. Alternately, initiation of transmission of the second HBS control message could occur when the signals received at DMT 114 from HBS 114 reach a certain predetermined level, and DMT 120 automatically switches to PWT mode. The second HBS control message may be transmitted as a PWT medium access control message (Mt) of cordless system 104, using an application specific escape message.

The transmitted second HBS control message is received at HBS 114. Referring now to FIG. 3, therein is shown a functional block diagram showing portions of HBS 114 according to the embodiment of FIG. 1. HBS 114 comprises HBS receiver (HBSRX) 300, HBS transmitter (HBSTX) 302, HBS controller 304, control information (CI) Processor 306, memory 308 and PSTN line interface 310. HBS 114 receives the message at HBSRX 300. In accordance with an aspect of this invention, HBS controller 304 recognizes the message as a second HBS control message and generates a signal to CI Processor 306 indicating that a second HBS control message has been received. CI processor 306 receives the message and then generates commands to HBS controller 304 in order that the control information is appropriately acted upon.

The embodiment of FIG. 1 also provides the capability for transferring information or data in the opposite direction, from the HBS 114 through the PWT air interface to DMT 120 and, then from DMT 120 through the PCS air interface to PCS system 102. This allows the network operator to collect data on the performance or usage of HBS 114 without the need to transmit signals through PSTN 118. By example, the data can reflect billing information for calls carried by the HBS 114, and can also reflect information to be used for maintenance of the PWT system.

If it is desired to transfer data from HBS 114 to PCS system 102, CI Processor 306 generates a data message that includes the data which it is desired to transfer, and initiates transmission of the message from HBS 114 to DMT 120 through HBSTX 302. The data message may be transmitted as a PWT P-channel message (Pt), using an application specific escape message. This data message is received through HBSRX 204 of DMT 114. DMT controller 208 recognizes the data message and stores it in DM memory 212. The data remains stored in DM memory 212 while DMT 120 is operated in PWT mode until the dual mode subscriber begins operation in PCS mode.

When the dual mode subscriber switches to PCS mode and register in PCS system 102, DMT controller 208 initiates transmission of a second data message that includes the data stored in DM memory 212 through PCSTX 202 to PCS system 102. This second data message is transmitted through a PCS system SMS message including a field identifying the message as including data from HBS 114. The second data message is transferred through the PCS system 102 to system controller 122. System controller 122 recognizes the data message as including data from HBS 114, and performs the appropriate actions, depending on the type of data received.

The embodiment of FIG. 1 may be used to assign, at predetermined times, new radio channels and transmission power levels to HBS 114 based on interference measurements performed at both HBS 114 and the BTSs 112 of PCS system.

The measurements performed at HBS 114 can be transferred to the PCS system through DMT 120 and, along with measurements made at the BTSs 112, can be input to system controller 122. New radio channels and transmission power levels may then be algorithmically determined by system controller 122 and transferred to HBS 114. The process of periodically making measurements and assigning channels and power levels may be repeated as necessary so that interference between HBS 114 and PCS system 102 is minimized.

Although the method and apparatus of the present invention has been illustrated and described with regard to presently preferred embodiments thereof, it will be understood by those skilled in the art that numerous modifications and substitutions may be made to the embodiments shown, and that numerous other embodiments of the invention may be implemented, without departing from the spirit and scope of the invention as defined in the following claims.

What is claimed is:

1. In a telecommunications network having a first and a second system and a mobile station capable of operating in either of said first or second systems, a method of controlling a base station of said first system, said method comprising the steps of:

transmitting a first message from the second system to the mobile station, said first message including selected control information; receiving a second message at the base station of the first system, said second message transmitted from the mobile station and including said selected control information;

setting, responsive to receiving said second message, at least one parameter in the base station according to said selected control information; and operating the base station according to said at least one parameter as set in said step of setting, at least during communications with the mobile station after the mobile station has obtained access to the second system.

2. The method of claim 1, further comprising, after said step of setting, the step of storing said at least one parameter within the mobile station.

3. The method of claim 2, wherein said second message received in said step of receiving is received upon registration of the mobile station in the first system.

4. The method of claim 1, wherein the mobile station is capable of operating in a first or second mode, said first and second modes being for operation in the first and second systems, respectively, and wherein said first message transmitted in said step of transmitting is transmitted while the mobile station is operating in said second mode and said second message received in said step of receiving is received while the mobile station is operating in said first mode.

5. The method of claim 4, wherein the second system comprises a cellular system and the first system comprises a cordless phone system.

6. The method of claim 1, wherein said first message comprises a short message service (SMS) message.

7. The method of claim 5, wherein the first system operates according to the PWT standard and the second system operates according to the PCS 1900 standard.

8. The method of claim 1, wherein said step of operating comprises setting a transmission power level for the base station according to said at least one parameter.

9. The method of claim 1, wherein said step of operating comprises setting at least one radio channel for operation of the base station according to said at least one parameter.

10. The method of claim 1, wherein said first and second systems are capable of operating in a common frequency band and said step of operating comprises operating said base station within a selected frequency band of said common frequency band according to said at least one parameter.

11. The method of claim 1, wherein said step of operating comprises operating said base station within a time period indicated by said at least one parameter.

12. In a telecommunications network having a first and a second system and a mobile station capable of operating in either of said first or second system, a method of collecting information on said first system, said method comprising the steps of:
collecting selected information within the first system;
transmitting a first message from the first system to the mobile station, said first message including said selected information;
receiving a second message at the second system, said second message transmitted from the mobile station and including said selected information; and
outputting responsive to receiving said second message, said selected information from said second system, wherein said selected in formation is utilized in administration of said first system.

13. The method of claim 12, further comprising, after the step of transmitting, the step of storing said selected information within the mobile station.

14. The method of claim 13, wherein said second message received in the step of receiving is received upon registration of the mobile station in the first system.

15. The method of claim 12, wherein said mobile station is capable of operating in a first or second mode, said first and second modes being for operation in said first and second systems, respectively, and wherein said first message transmitted in said step of transmitting is transmitted while the mobile station is operating in said first mode and said second message received in said step of receiving is received while the mobile station is operating in said second mode.

16. The method of claim 15, wherein the first system comprises a cordless phone system and the second system comprises a cellular system.

17. The method of claim 16, wherein the first system operates according to the PWT standard and the second system operates according to the PCS 1900 standard.

18. The method of claim 12, wherein said selected information comprises billing information for calls carried in said first system.

19. The method of claim 12, wherein said selected information comprises information to be used for maintenance of said first system.

20. An apparatus for controlling a base station in a telecommunications network comprising a first system and a second system, said apparatus comprising:
a first controller in said first system, said first controller for generating control information and for initiating transmission of a first message over a first air interface, wherein said first message includes said control information;
a second controller and a base station in said second system, said base station comprising second controller for receiving and processing said control information, wherein said control information is transmitted to said second system over a second air interface in a second message, wherein said second controller sets at least one parameter for operation of said base station according to said control information; and a mobile station capable of operating in either said first or second systems, wherein said mobile station communicates with said first system over said first air interface and with said second system over said second air interface, and wherein said mobile station comprises a receiver for receiving said first message over said first air interface, a memory device for storing said control information, and a controller for generating said second message from said control information and initiating transmission of said second message over said second air interface to said second system, wherein said base station and said mobile station communicate with one another according to said at least one parameter as set in said base station at least during communications after the mobile station has obtained access to the second system.

21. The telecommunications network of claim 20 wherein said first system operates according to the PCS 1900 standard and said second system operates according to the PWT standard.

22. The telecommunications network of claim 20, wherein said second controller initiates the setting of transmission power levels for said base station according to said selected control information.

23. The telecommunications network of claim 20, wherein said second controller initiates the setting of at least one radio channel for said base station according to said selected control information.

24. The telecommunications network of claim 20, wherein said second controller initiates the setting of an allowed time of operation for said base station according to said selected control information.

25. The telecommunications network of claim 20, wherein said first and second systems are capable of operating in a common frequency band and, said second controller initiates the setting of a selected frequency band for operation of said base station according to said selected control information, wherein said selected frequency band is within said common frequency band.

26. A telecommunications network comprising:
a first system including a first controller and at least one base station, said first controller for collecting data reflecting an operation of said at least one base station, said first controller further for initiating transmission of a first message over a first air interface, wherein said first message includes said data;

a second system including a second controller, said second controller for receiving and processing said data, wherein said data is transmitted to said second system over a second air interface in a second message, said second controller further outputting said data from said second system, wherein said data is utilized in administration of said first system; and a mobile station capable of operating in either said first or second system, wherein said mobile station communicates with said first system over said first air interface and with said second system over said second air interface, and wherein said mobile station comprises a receiver for receiving said first message over said first air interface, a memory device for storing said data included in said first message, and a controller for generating said second message from said data as stored in said memory device and initiating transmission of said second message over said second air interface to said second system.

27. The telecommunications network of claim 26 wherein said first system operates according to the PWT standard and said second system operates according to the PCS 1900 standard.

28. The telecommunications system of claim 26 wherein said data is data for use in maintenance of said first system.

29. A telecommunication system, comprising:

a first wireless system comprising a first transceiver and a first controller coupled to said first transceiver, said first controller comprising means for generating a control message and for transmitting said control message using said first transceiver;

a second wireless system comprising a second transceiver and a second controller coupled to said second transceiver, said second controller comprising means for receiving a control message from said second transceiver and for setting at least one parameter in said second wireless system according to said control message; and a wireless user terminal comprising at least one third transceiver capable of operation at a given time with one of said first transceiver and said second transceiver, said wireless user terminal further comprising a memory coupled to said at least one third transceiver and a third controller responsive to a receipt of said control message from said first transceiver for storing said received control message in said memory, and for subsequently transmitting said stored control message to said second transceiver, wherein said second wireless system and said wireless user terminal communicate with one another according to said at least one parameter set in said second wireless system at least during communications after said wireless user terminal has obtained access to said second wireless system.

30. A telecommunications system as set forth in claim 29, wherein said first and second transceivers operate with first and second frequency bands, respectively, and wherein said first and second frequency bands are one of overlapping bands or non-overlapping bands.

* * * * *